(12) United States Patent
Hashimoto et al.

(10) Patent No.: US 8,813,520 B2
(45) Date of Patent: Aug. 26, 2014

(54) GLASS SUBSTRATE AND METHOD FOR MANUFACTURING THE SAME

(75) Inventors: Kazuaki Hashimoto, Tokyo (JP); Yoshikazu Hirose, Tokyo (JP)

(73) Assignee: HOYA Corporation, Tokyo (JP)

( * ) Notice: Subject to any disclaimer, the term of this patent is extended or adjusted under 35 U.S.C. 154(b) by 213 days.

(21) Appl. No.: 12/647,098

(22) Filed: Dec. 24, 2009

(65) Prior Publication Data
US 2010/0167059 A1  Jul. 1, 2010

(30) Foreign Application Priority Data
Dec. 26, 2008  (JP) ................................. 2008-333215

(51) Int. Cl.
*C03C 15/00* (2006.01)
*C03C 21/00* (2006.01)

(52) U.S. Cl.
CPC ............... *C03C 21/002* (2013.01); *C03C 15/00* (2013.01)
USPC ............................ 65/30.14; 65/30.13; 65/31

(58) Field of Classification Search
None
See application file for complete search history.

(56) References Cited

U.S. PATENT DOCUMENTS

| | | | |
|---|---|---|---|
| 3,357,876 A | | 12/1967 | Rinehart et al. |
| 3,464,880 A | * | 9/1969 | Rinehart ........................ 428/410 |
| 3,660,060 A | | 5/1972 | Spanoudis |
| 3,772,135 A | | 11/1973 | Hara et al. |
| 4,156,755 A | * | 5/1979 | Rinehart ........................ 428/410 |
| 4,849,002 A | | 7/1989 | Rapp |
| 5,252,112 A | * | 10/1993 | Shibaoka et al. ............. 65/30.13 |
| 5,279,851 A | | 1/1994 | Minosou et al. |
| 5,468,346 A | * | 11/1995 | Bruce et al. ...................... 216/34 |
| 6,332,338 B1 | | 12/2001 | Hashimoto et al. |
| 6,660,060 B2 | | 12/2003 | Chasen |
| 2003/0109202 A1 | * | 6/2003 | Matsuno et al. ................. 451/41 |
| 2003/0164005 A1 | | 9/2003 | Saito et al. |
| 2004/0035153 A1 | * | 2/2004 | Koike et al. ......................... 65/61 |
| 2005/0250639 A1 | | 11/2005 | Siebers et al. |
| 2008/0020919 A1 | | 1/2008 | Murata |
| 2008/0241603 A1 | | 10/2008 | Isono |
| 2008/0286548 A1 | | 11/2008 | Ellison et al. |
| 2009/0110914 A1 | * | 4/2009 | Zhuang et al. ................ 428/335 |
| 2009/0197048 A1 | * | 8/2009 | Amin et al. .................... 428/142 |

(Continued)

FOREIGN PATENT DOCUMENTS

| | | |
|---|---|---|
| CN | 1369449 | 9/2002 |
| EP | 0 475 763 | 3/1992 |

(Continued)

OTHER PUBLICATIONS

Gy, "Ion Exchange for glass strengthening", Science & Eng. 149 (2008) 159-165.*

(Continued)

*Primary Examiner* — Matthew Daniels
*Assistant Examiner* — Lisa Herring
(74) *Attorney, Agent, or Firm* — Frommer Lawrence & Haug LLP

(57) ABSTRACT

A glass substrate chemically strengthened, includes a primary surface that has a compressive stress layer formed in an uppermost surface layer thereof. The compressive stress layer is configured to enhance strength of the glass substrate due to a compressive stress generated in the compressive stress layer. The compressive layer consists of a layer of a potassium ion concentration equal to or less than 5000 parts per million (ppm).

8 Claims, 4 Drawing Sheets

(56) References Cited

U.S. PATENT DOCUMENTS

| | | | |
|---|---|---|---|
| 2010/0009154 A1* | 1/2010 | Allan et al. | 428/220 |
| 2010/0167059 A1 | 7/2010 | Hashimoto et al. | |
| 2011/0003619 A1 | 1/2011 | Fujii | |
| 2011/0129693 A1 | 6/2011 | Isono | |
| 2011/0165824 A1 | 7/2011 | Saito et al. | |
| 2012/0052275 A1 | 3/2012 | Hashimoto et al. | |
| 2012/0083401 A1 | 4/2012 | Koyama et al. | |

FOREIGN PATENT DOCUMENTS

| | | |
|---|---|---|
| JP | 1-93004 | 4/1989 |
| JP | HEI 1-93004 | 12/1989 |
| JP | 2004-299199 | 10/2004 |
| JP | 2005-174500 | 6/2005 |
| JP | 2007-99557 | 4/2007 |
| JP | 2007-099557 | 4/2007 |
| WO | WO 2007073664 A1 * | 7/2007 |

OTHER PUBLICATIONS

CN13669449 with English Machine Translation performed Jun. 27, 2014, by ProQuest Dialog Patents.*

Print out from Database WPI Week 200749 Thomson Scientific; London, Great Britain—2007-201152, & JP 2007 0995574—XP-002576766.

Notification of First Office Action issued for Chinese Application No. 200910265503.0 dated Apr. 1, 2013.

Notification of Third Office Action and English translation for Chinese Patent Application No. 200910265503.0 dated Jun. 6, 2014.

Print out from Database WPI Week 200749 Thomson Scientific; London, Great Britain 2007-501152, & JP 2007-099557 A-XP-002576766.

Taiwanese Office Action with an English translation for Patent Application No. 098145341 dated Mar. 13, 2014.

* cited by examiner

GLASS SUBSTRATE AND METHOD FOR MANUFACTURING THE SAME

BACKGROUND OF THE INVENTION

The following description relates to one or more technologies to enhance the strength of a glass substrate for a cover glass adapted to protect a display screen of a mobile terminal device such as a cellular phone and a personal digital assistant (PDA).

In a mobile terminal device such as a cellular phone and a PDA, in order to prevent an external (impulsive) for from being applied to a display thereof, a plastic protective plate, such as a highly-transparent acrylic resin protective plate, is disposed a predetermined distance away outward from the display (e.g., see Japanese Patent Provisional Publication No. 2004-299199).

However, since such an acrylic resin protective plate is easily bent by an external force, the mobile terminal device has to be designed with such a wide distance between the protective plate and the display as to accept the bending deflection of the acrylic resin protective plate. Therefore, it causes difficulty in thinning the mobile terminal device.

For the aforementioned reason, a protective plate using a chemically strengthened glass, which restrains bending and maintains a certain level of high strength even though formed into a thin shape, has been proposed to realize thinning of the mobile terminal device (e.g., see Japanese Patent Provisional Publication No. 2007-99557, hereinafter simply referred to as the '557 Publication). The '557 Publication discloses a cover glass for a mobile terminal device and a method for manufacturing the cover glass. According to the '557 Publication, the cover glass is manufactured so as to be hard to bend and damage, by cutting a sheet glass of a specific glass composition into a predetermined shape, polishing each side of the sheet glass to a planer mirror finish, and forming a compressive stress layer in a surface layer of each side of the sheet glass by a chemical strengthening process.

SUMMARY OF THE INVENTION

However, the glass substrate for a cover glass is required to have such a high strength that the glass substrate can receive a great external stress applied onto a primary surface thereof. In addition, the cover glass for the mobile terminal device is, at the same time, required to be lightened. Therefore, a glass substrate, which has a very high strength even though formed into a thin shape, is demanded for the mobile terminal device.

Aspects of the present invention are advantageous to provide one or more improved technologies that attain a glass substrate having a very high strength even though formed to be thin.

According to aspects of the present invention, a glass substrate chemically strengthened is provided, which includes a primary surface that has a compressive stress layer formed in an uppermost surface layer thereof. The compressive stress layer is configured to enhance strength of the glass substrate due to a compressive stress generated in the compressive stress layer. The compressive stress layer consists of a layer of a potassium ion concentration equal to or less than 5000 parts per million (ppm).

Optionally, the compressive stress layer may be configured with an ion exchange layer of a potassium ion concentration more than 5000 ppm being completely removed therefrom.

Optionally, the glass substrate may be formed from molten glass by a down-draw method.

Still optionally, the glass substrate may be configured with aluminosilicate glass that contains at least one of SiO2, Al2O3, Li2O, and Na2O. Further optionally, the glass substrate may be configured by chemically strengthening a glass substrate that contains substantially no potassium ion.

Yet optionally, the glass substrate may be configured to be used for a cover glass for protecting a display screen of a mobile terminal device.

According to aspects of the present invention, further provided is a method for manufacturing a glass substrate. The method includes the steps of chemically strengthening the glass substrate by immersing the glass substrate in heated molten salt such that ions of the glass substrate are ion-exchanged for ions of the molten salt, and removing an ion exchange layer formed in an uppermost surface layer of a primary surface of the glass substrate in the step of chemically strengthening the glass substrate. It is noted that the ion exchange layer may have a potassium ion concentration more than 5000 ppm.

Optionally, in the step of removing the ion exchange layer, the ion exchange layer may be removed by etching.

Further optionally, the etching may be implemented in a wet manner using etching solution that contains at least one of hydrofluoric acid, hexafluorosilicic acid, and buffered hydrofluoric acid.

Still optionally, in the step of chemically strengthening the glass substrate, the glass substrate may be chemically strengthened using at least one of molten salt of potassium nitrate and molten salt of sodium nitrate at a temperature equal to or less than a glass transition point of the glass substrate.

BRIEF DESCRIPTION OF THE ACCOMPANYING DRAWINGS

Figure 2:
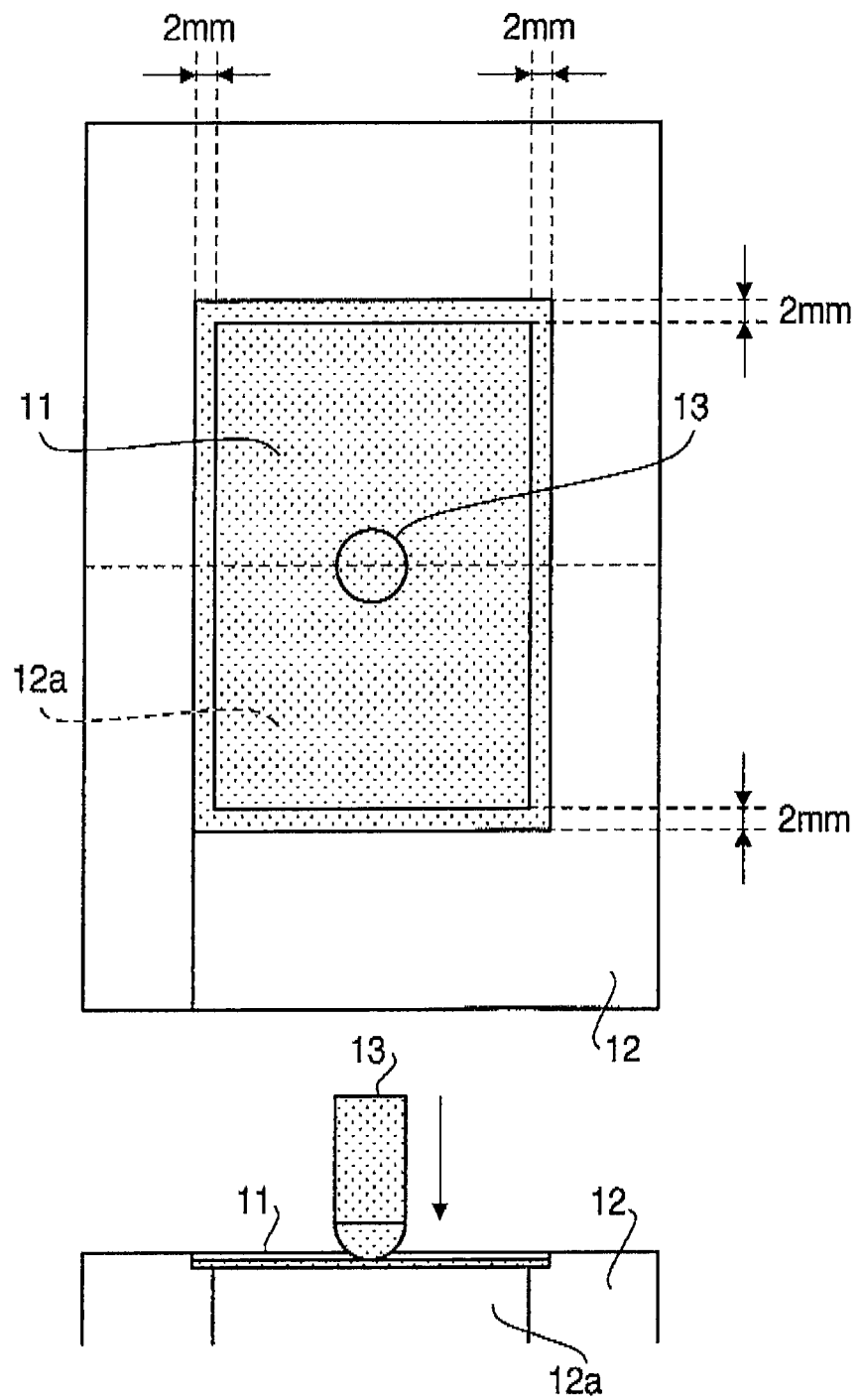

FIG. 2 schematically shows an apparatus for measuring strength of the glass substrate in the embodiment according to one or more aspects of the present invention.

Figure 3:
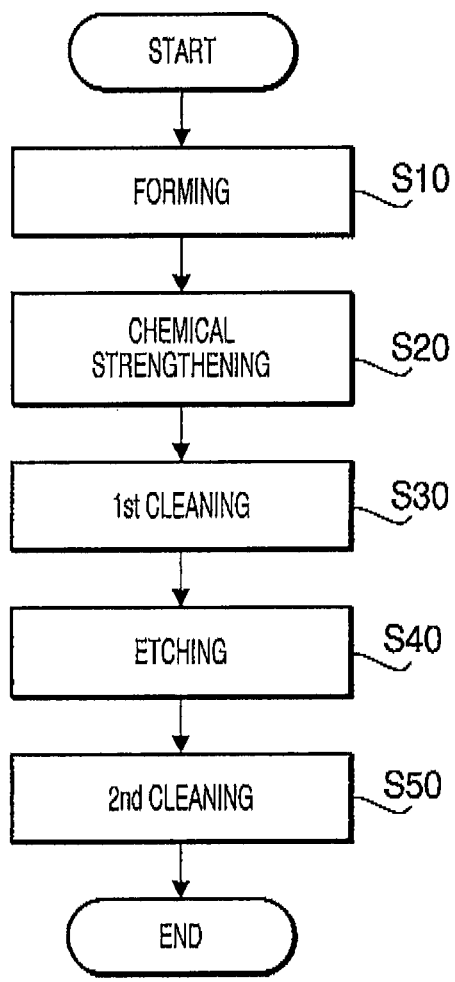

FIG. 3 is a flowchart schematically showing a procedure of a method for fabricating the glass substrate in the embodiment according to one or more aspects of the present invention.

DETAILED DESCRIPTION OF THE EMBODIMENTS

Hereinafter, an embodiment according to aspects of the present invention will be set forth with reference to the accompanying drawings.

Figures 1A, 1B:
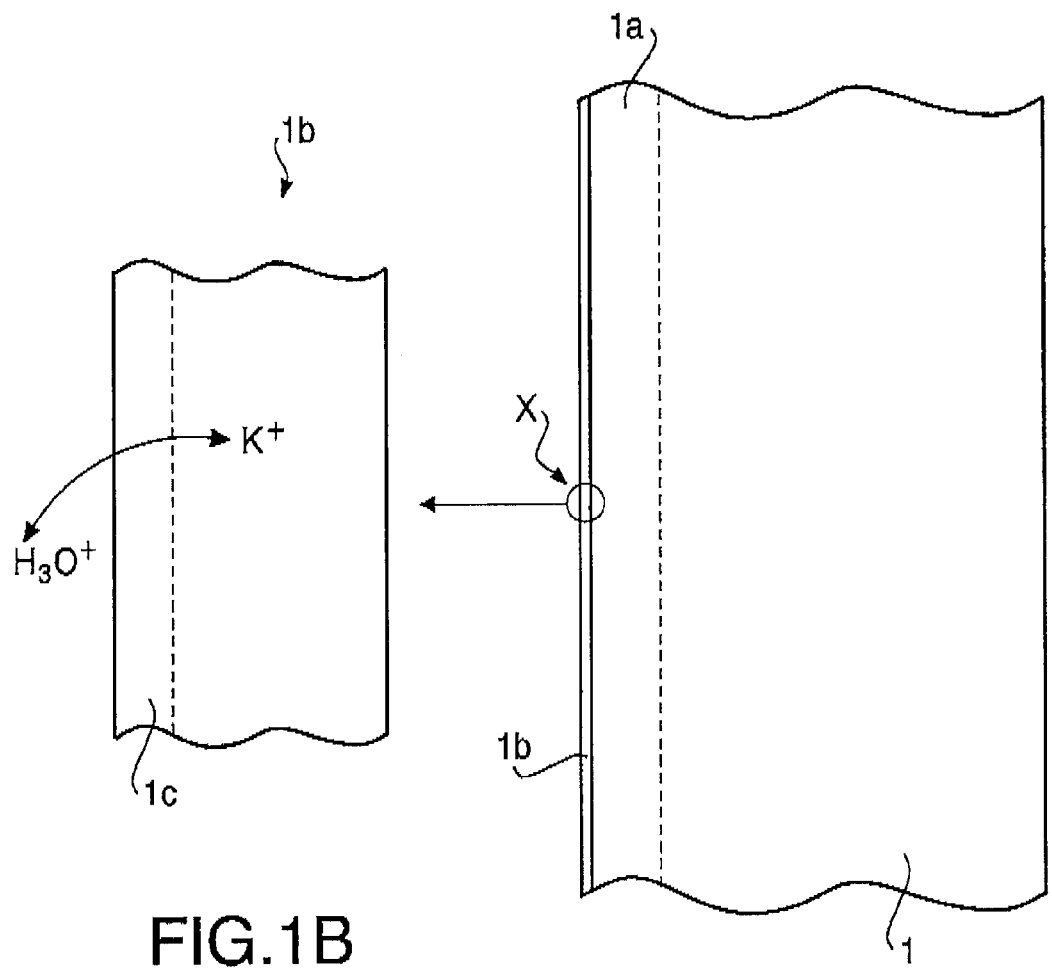
FIGS. 1A and 1B show an area that contains a primary surface of a glass substrate chemically strengthened in a conventional method.

FIGS. 1A and 1B illustrate a glass substrate 1 chemically strengthened in a conventional method. FIG. 1A shows an area that contains a primary surface of the glass substrate. FIG. 1B is an enlarged view of a portion X shown in FIG. 1A. The glass substrate 1 shown in FIG. 1A is chemically strengthened to be immersed in heated molten salt for chemical strengthening such that ions contained in the glass substrate are ion-exchanged for ions of the molten salt. The glass substrate 1 has a compressive stress layer 1a formed in a surface layer thereof. The compressive stress layer 1a is configured to enhance the strength of the glass substrate 1 due to compressive stresses generated therein. Additionally, in an uppermost surface layer of the compressive stress layer 1a (in a region of a depth of several microns from an uppermost surface of the glass substrate 1), an ion exchange layer 1b with a very high alkali ion concentration is formed by the chemical strengthening.

When the glass substrate 1 with the ion exchange layer 1b configured as above is water-cleaned (water cleaning after the chemical strengthening), as illustrated in FIG. 1B, potassium ions ($K^+$), which exist in the ion exchange layer 1b formed in the chemical strengthening, arc ion-exchanged for hydrogen ions ($H_3O^+$) each of which has a smaller ion radius than that of the potassium ion ($K^+$). Thereby, an uppermost surface layer of the glass substrate 1 becomes a hydration layer 1c. Consequently, in the ion exchange layer 1b of the glass substrate 1, a tensile stress layer, configured to deteriorate the strength of the glass substrate 1 owing to tensile stresses generated therein, is formed by the cleaning process. Especially, when acid solution is used as cleaning liquid in the cleaning process, the above effect is remarkably exerted. Furthermore, the chemical strengthening (i.e., the ion exchange) proceeds in a glass substrate formed in a down-draw method more quickly than in a glass substrate which is formed in a press method and thereafter polished. Hence, the above effect is exerted on the glass substrate formed in the down-draw method more remarkably than on the glass substrate formed in the press method and thereafter polished.

Figure 1C:
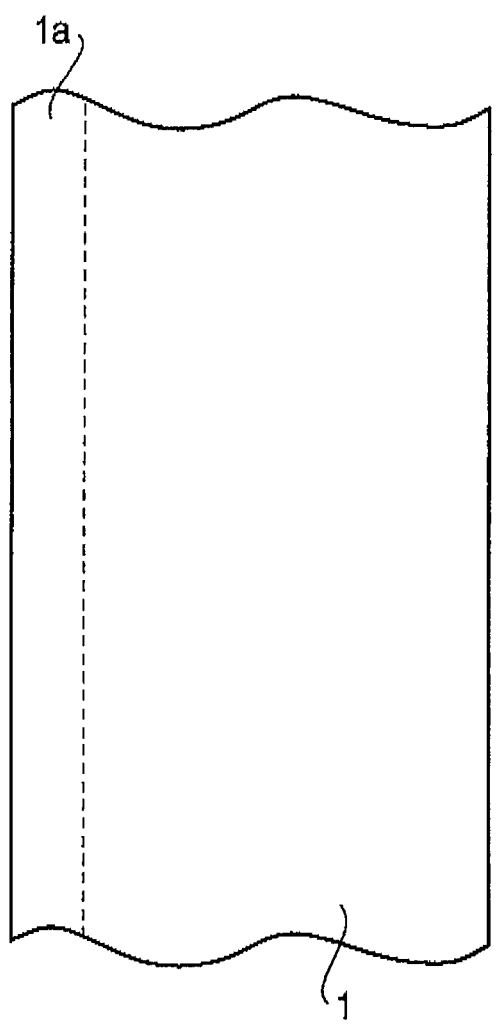
FIG. 1C shows an area that contains a primary surface of a glass substrate chemically strengthened in an improved method in an embodiment according to one or more aspects of the present invention.

In an embodiment according to aspects of the present invention, by removing an ion exchange layer formed in a surface layer of a glass substrate in chemical strengthening, it is possible to prevent a tensile stress layer from being formed due to a subsequently-performed cleaning process and thus enhance the strength of the glass substrate. More specifically, in the embodiment, the glass substrate is chemically strengthened to be immersed in heated molten salt such that ions of the glass substrate are ion-exchanged for ions of the molten salt. Then, the ion exchange layer, formed on a primary surface of the glass substrate in the chemical strengthening, is removed. Namely, as illustrated in FIG. 1C, the glass substrate of the embodiment is configured with the ion exchange layer 1b shown in FIGS. 1A and 1B being completely removed. Thereby, it is possible to attain a glass substrate that has a very high strength even though formed in a thin shape.

A technique has been known which is for reducing or restraining elution of an alkaline component from a chemically strengthened glass substrate (e.g., see Japanese Patent Provisional Publication No. HEI 10-194788). Nevertheless, it is noted that the technique, which is adapted to de-alkalize a surface of the glass substrate or to form, on the surface of the glass substrate, a layer to protect elution of the alkaline component, is essentially-different from the technical concept according to aspects of the present invention.

Based on the aforementioned view points, the glass substrate in the embodiment can be manufactured by immersing the glass substrate in the heated molten salt such that the glass substrate is chemically strengthened with ions thereof being ion-exchanged for ions of the molten salt, and then removing an ion exchange layer formed on a primary surface of the glass substrate in the chemical strengthening.

The glass substrate obtained in the aforementioned manner has a compressive stress layer formed by the chemical strengthening. However, the compressive stress layer does not include an ion exchange layer, and in the primary surface, the concentration of the potassium ions is equal to or less than 5000 ppm. The potassium ion concentration in the primary surface of the glass substrate and the surface state of the glass substrate as to whether the primary surface contains an ion exchange layer can be detected, for instance, by a wavelength dispersive X-ray spectrometer (WDX) or an energy dispersive X-ray spectrometer (EDX). Incidentally, the WDX is configured to irradiate an X-ray or an electron beam onto a specimen, extract, through an analyzing crystal, a specific wavelength of fluorescent X-ray from various wavelengths of fluorescent X-rays emitted by a region of the specimen excited by the irradiation, and measure the wavelength and the intensity of the extracted fluorescent X-ray with a detector. Further, the EDX is configured to irradiate an X-ray or an electron beam onto a specimen, amplify all of various wavelengths of fluorescent X-rays emitted by a region of the specimen excited by the irradiation, and identify the wavelength and the intensity of each of the various wavelengths of fluorescent X-rays with an analyzer.

The glass substrate to be used may be formed into a sheet shape directly from molten glass, or formed by cutting out a predetermined thickness of glass sheet from a certain thickness of glass body and finishing the glass sheet to be an intended thickness of glass sheet with the primary surface thereof being polished. The glass substrate is desired to be formed in a sheet shape directly from molten glass. This is because the primary surface of the glass substrate formed in a sheet shape directly from molten glass is a hot-formed surface which has very high flatness and smoothness with no microcrack. A down-draw method or a float method may be applied as a method for forming the glass substrate into a sheet shape directly from molten glass. The glass substrate is desired to be formed from molten glass in the down-draw method.

In addition, the glass substrate is preferred to be configured with aluminosilicate glass, soda lime glass, or borosilicate glass. Among them, the glass substrate is desired to be configured with aluminosilicate glass that contains at least one of $SiO_2$, $Al_2O_3$, $Li_2O$, and $Na_2O$. Especially, the aluminosilicate glass is desired to contain 62-75 wt % $SiO_2$, 5-15 wt % $Al_2O_3$, 4-10 wt % $Li_2O$, 4-12 wt % $Na_2O$, and 5.5-15 wt % $ZrO_2$ (it is noted that "wt %" represents % by weight). Furthermore, the aluminosilicate glass is desired to have a composition defined with the weight ratio $Na_2O/ZrO_2$:0.5-2.0 and the weight ratio $Al_2O_3/ZrO_2$:0.4-2.5. Moreover, the glass substrate is desired to be made from ingredients with substantially no potassium oxide.

$SiO_2$ is a primary component of the glass substrate, and preferred to be contained in the glass substrate with 62-75 wt % in consideration of chemical durability and/or a melting temperature of the glass material.

$Al_2O_3$ is contained to enhance the ion exchange capability of the surface of the glass substrate, and preferred to be contained in the glass substrate with 5-15 wt % in consideration of the chemical durability of the glass material.

$Li_2O$ is an essential component for the chemical strengthening. Specifically, $Li_2O$ is ion-exchanged, at a surface layer of the glass substrate, mainly for a Na ion in an ion exchange bath. $Li_2O$ is preferred to be contained in the glass substrate with 4-10 wt % in consideration of an ion exchange capability and/or the chemical durability of the glass material.

$Na_2O$ is an essential component for the chemical strengthening. Specifically, $Na_2O$ is ion-exchanged, at the surface layer of the glass substrate, for a K ion in the ion exchange bath. $Na_2O$ is preferred to be contained in the glass substrate with 4-12 wt % in consideration of the chemical durability and/or mechanical strength of the glass material.

$ZrO_2$ has an effect to enhance the mechanical strength of the glass substrate. $ZrO_2$ is desired to be contained in the glass substrate with 5.5-15 wt % in order to ensure stable production of homogeneous glass and the chemical durability of the glass material.

The chemical strengthening is implemented using molten salt, such as potassium nitrate, at a molten salt temperature of 300-450° C. during a processing time of 1-30 hours. Especially, the chemical strengthening is desired to be implemented using molten salt of potassium nitrate and/or sodium nitrate at a molten salt temperature equal to or less than a glass transition point of the material of the glass substrate. Such low-temperature chemical strengthening makes it possible to ion-exchange an alkali ion of the surface layer for an ion of a large ion radius. In this case, the processing time is desired to be equal to or less than 16 hours. After the chemical strengthening, preferably, the glass substrate may be cleaned in order to remove extraneous material such as molten salt attached to the surface of the glass substrate. In this case, a cleaning method may be employed such as a method using cleaning agent (e.g., water), a dipping method to dip the glass substrate in cleaning agent, and a scrubbing method to have the glass substrate in contact with a roll body which is rotating while running cleaning agent. The dipping method may be implemented under an ultrasonic wave being applied.

As a method for removing the ion exchange layer formed on the primary surface of the glass substrate through the chemical strengthening, etching or polishing may be applied. In the case where the glass substrate is formed into a sheet shape directly from molten glass, the ion exchange layer is preferred to be removed by etching so as to avoid damage such as a scratch on the primary surface.

Etching solution used for removing the ion exchange layer is desired to contain at least one of hydrofluoric acid, hexafluorosilicic acid, and buffered hydrofluoric acid. In this case, an etching temperature is desired to be within a range of 20-60° C., further preferably, within a range of 30-50° C. Additionally, an etching time is desired to be 3-60 minutes. In the etching process, the etching solution may be circulated by a pump in the state where the glass substrate is immersed in the etching solution, or the glass substrate may be moved up and down in the state where the glass substrate is immersed in the etching solution. Alternatively, the etching solution may be showered onto the glass substrate. Further, after removing the ion exchange layer, the glass substrate may be cleaned in order to remove extraneous material attached to the surface of the glass substrate using water or aqueous solution. In addition, commercially available cleaning agent may be used such as neutral detergent, surface active agent, and alkaline detergent, as well as water or aqueous solution. As aqueous solution in this case, sulfuric acid, hydrochloric acid, or nitric acid may be employed. The cleaning may be performed under an ultrasonic wave being applied.

The glass substrate manufactured as above is suitable for a cover glass employed to protect (a display screen of) a mobile terminal device such as a cellular phone and a PDA. In this case, the glass substrate is cut into a desired shape by forming a resist pattern on the primary surface of the sheet-shaped glass substrate and etching the glass substrate using etchant with the resist pattern as a mask. The cover glass, of which an outer shape is defined by the etching, has etched end faces of very high smoothness. Additionally, the end faces of the cover glass, configured with molten glass surfaces, do not have any micro-crack which would inevitably be caused by a mechanical process. The cover glass configured in this manner has a high mechanical strength required for a cover glass for a mobile terminal device, even though the cover glass for the mobile terminal device has a complex outer shape. It is noted that preferably, the chemical strengthening may be implemented after the glass substrate is formed into the desired shape. Thereby, it is possible to chemically strengthen end faces of the glass substrate as well, and thus prevent the glass substrate from being chipped or broken when attached to a mobile terminal device.

An etching method for etching the glass substrate to obtain the desired shape as mentioned above may be any of wet etching and dry etching. Any etchant may be applicable to the wet etching as far as the etchant can etch the glass substrate. For example, acidic solution with hydrofluoric acid as a main component may be applicable as etchant for the wet etching. Further, mixture solution, which contains at least one of sulfuric acid, nitric acid, hydrochloric acid, and hydrofluosilic acid as well as hydrofluoric acid, may be applicable as etchant for the wet etching. On the other hand, any etchant may be applicable to the dry etching as far as the etchant can etch the glass substrate. For example, fluorinated gas may be applicable as etchant for the dry etching. The glass substrate may be cut into the desired shape by using scribe processing or laser processing.

The aforementioned glass substrate in the embodiment is manufactured by immersing the glass substrate in the heated molten salt such that the glass substrate is chemically strengthened with ions thereof being ion-exchanged for ions of the molten salt, and removing the ion exchange layer formed on the primary surface of the glass substrate in the chemical strengthening. Therefore, it is possible to prevent the ions of the glass substrate from being ion-exchanged for hydrogen ions in the cleaning process, and thus enhance the strength of the glass substrate.

Subsequently, practical examples will be set forth to clarify the effects of the present invention. FIG. 3 shows a general procedure of a method for fabricating a glass substrate in each of the following practical examples.

Practical Example 1

Initially, aluminosilicate glass, which contains 63.5 wt % $SiO_2$, 8.2 wt % $Al_2O_3$, 8.0 wt % $Li_2O$, 10.4 wt % $Na_2O$, and 11.9 wt % $ZrO_2$, is formed by the down-draw method into a sheet shape of 80 mm (a long side)×45 mm (a short side)×0.5 mm (thickness).

Subsequently, the glass substrate is chemically strengthened to be immersed in 360° C. mixture salt bath of 60 wt % $KNO_3$ and 40 wt % $NaNO_3$ for 6 hours. Thereafter, the glass substrate is water-cleaned to remove extraneous material such as molten salt attached thereto. Next, the glass substrate is immersed in 35° C. etching solution of 3 wt % $H_2SiF_6$ and moved up and down in the etching solution for 10 minutes. Thereby, the primary surface of the glass substrate is etched by about 1 μm. After that, the glass substrate is cleaned to be immersed in 40° C. cleaning solution of 15 wt % $H_2SO_4$ for 5 minutes under an ultrasonic wave of 40 kHz being applied. Thus, the glass substrate of a practical example 1 is manufactured. It is noted that the potassium ion concentration in the primary surface of the obtained glass substrate is measured by the WDX to be 5000 ppm.

Strength measurement is made for the obtained glass substrate using an apparatus shown in FIG. 2. Specifically, as illustrated in FIG. 2, the obtained glass substrate 11 is placed on a supporting stage 12 which has an opening 12a smaller than the glass substrate 11 at a center of the supporting stage 12. Then, the center of the glass substrate 11 is pressed by a pressing pin 13 being moved down at a speed of 10 mm/minute. Thereby, a breaking load for the glass substrate 11 is measured at the moment when the glass substrate 11 is fractured. The same strength measurement is made for 30 glass substrates to determine an average value, a maximum value, and a standard deviation of the strength (i.e., the breaking load) of the glass substrate 11. The results will be shown in Table 1 below.

Practical Example 2

A glass substrate, formed into the same sheet shape in the same manner as the practical example 1, is chemically strengthened to be immersed in 360° C. mixture salt bath of 60 wt % $KNO_3$ and 40 wt % $NaNO_3$ for 6 hours. Thereafter, the glass substrate is water-cleaned to remove extraneous material such as molten salt attached thereto. Next, the glass substrate is etched to be showered with 45° C. etching solution of 3 wt % $H_2SiF_6$ for 20 minutes. Thereby, the primary surface of the glass substrate is etched by about 2 μm. After that the glass substrate is cleaned to be immersed in 40° C. cleaning solution of 15 wt % $H_2SO_4$ for 5 minutes under an ultrasonic wave of 40 kHz being applied. Thus, the glass substrate of a practical example 2 is manufactured. It is noted that the potassium ion concentration in the primary surface of the obtained glass substrate is measured by the WDX to be 2000 ppm. The same strength measurement as the practical example 1 is conducted for the glass substrate obtained in the practical example 2. The results will be shown together in Table 1 below.

Practical Example 3

A glass substrate, formed into the same sheet shape in the same manner as the practical example 1, is chemically strengthened to be immersed in 360° C. mixture salt bath of 60 wt % $KNO_3$ and 40 wt % $NaNO_3$ for 6 hours. Thereafter, the glass substrate is water-cleaned to remove extraneous material such as molten salt attached thereto. Subsequently, the glass substrate is etched to be immersed in 35° C. etching solution of 6 wt % $H_2SiF_6$ for 10 minutes while the etching solution is being circulated by a pump. Thereby, the primary surface of the glass substrate is etched by about 3 μm. After that, the glass substrate is cleaned to be immersed in 40° C. cleaning solution of 15 wt % $H_2SO_4$ for 5 minutes under an ultrasonic wave of 40 kHz being applied. Thus, the glass substrate of a practical example 3 is manufactured. It is noted that the potassium ion concentration in the primary surface of the obtained glass substrate is measured by the WDX to be 1500 ppm. The same strength measurement as the practical example 1 is conducted for the glass substrate obtained in the practical example 3. The results will be shown together in Table 1 below.

Comparative Example 1

A glass substrate, formed into the same sheet shape in the same manner as the practical example 1, is chemically strengthened to be immersed in 360° C. mixture salt bath of 60 wt % $KNO_3$ and 40 wt % $NaNO_3$ for 6 hours. Thereafter, the glass substrate is cleaned to be immersed in 40° C. cleaning solution of 15 wt % $H_2SO_4$ for 10 minutes under an ultrasonic wave of 40 kHz being applied. Thus, the glass substrate of a comparative example 1 is manufactured. It is noted that the potassium ion concentration in the primary surface of the obtained glass substrate is measured by the WDX to be 6000 ppm. The same strength measurement as the practical example 1 is conducted for the glass substrate obtained in the comparative example 1. The results will be shown together in Table 1 below.

TABLE 1

| | Breaking Load P (N) | | |
|---|---|---|---|
| | Average | Maximum | Standard Deviation |
| Practical Example 1 | 546 | 585 | 28.1 |
| Practical Example 2 | 577 | 605 | 19.0 |
| Practical Example 3 | 601 | 620 | 18.0 |
| Comparative Example 1 | 269 | 450 | 102.1 |

As understood from Table 1, the glass substrates of the practical examples 1 to 3 have higher breaking strengths than that of the comparative example 1, respectively, even though formed with a thickness of 0.5 mm. In addition, the glass substrates of the practical examples 1 to 3 show smaller standard deviations in their breaking strengths than that of the comparative example 1, respectively. These results are considered to be caused by that in each of the practical examples 1 to 3, the ion exchange layer formed on the primary surface of the glass substrate is removed by the etching. Thereby, in each of the practical examples 1 to 3, it is possible to prevent the ions of the glass substrate from being ion-exchanged for hydrogen ions in the cleaning and thus avoid formation of a tensile stress layer which would deteriorate the strength of the glass substrate.

Practical Example 4

Initially, aluminosilicate glass, which contains 63.5 wt % $SiO_2$, 8.2 wt % $Al_2O_3$, 8.0 wt % $Li_2O$, 10.4 wt % $Na_2O$, and 11.9 wt % $ZrO_2$, is formed by the down-draw method into a sheet shape of 100 mm (a long side)×50 mm (a short side)×0.7 mm (thickness).

Subsequently, the glass substrate is chemically strengthened to be immersed in 380° C. mixture salt bath of 60 wt % $KNO_3$ and 40 wt % $NaNO_3$ for 2 hours. Thereafter, the glass substrate is water-cleaned to remove extraneous material such as molten salt attached thereto. Next, the glass substrate is immersed in 30° C. etching solution of 1 wt % HF and moved up and down in the etching solution for 5 minutes. Thereby, the primary surface of the glass substrate is etched by about 3 μm. After that, the glass substrate is cleaned to be immersed in 30° C. cleaning solution of 10 wt % HCl for 20 minutes under an ultrasonic wave of 40 kHz being applied. Thus, the glass substrate of a practical example 4 is manufactured. It is noted that the potassium ion concentration in the primary surface of the obtained glass substrate is measured by the WDX to be 500 ppm. The same strength measurement as the practical example 1 is conducted for the glass substrate obtained in the practical example 4. The results will be shown in Table 2 below.

Practical Example 5

A glass substrate, formed into the same sheet shape in the same manner as the practical example 4, is chemically strengthened to be immersed in 380° C. mixture salt bath of 60 wt % $KNO_3$ and 40 wt % $NaNO_3$ for 2 hours. Thereafter, the glass substrate is water-cleaned to remove extraneous material such as molten salt attached thereto. Next, the glass substrate is etched to be immersed in 45° C. etching solution of 0.5 wt % HF for 10 minutes while the etching solution is being circulated by a pump. Thereby, the primary surface of the glass substrate is etched by about 2 μm. After that, the glass substrate is cleaned to be immersed in 30° C. cleaning solution of 10 wt % HCl for 20 minutes under an ultrasonic wave of 40 kHz being applied. Thus, the glass substrate of a practical example 5 is manufactured. It is noted that the potassium ion concentration in the primary surface of the obtained glass substrate is measured by the WDX to be 1000 ppm. The same strength measurement as the practical example 1 is conducted for the glass substrate obtained in the practical example 5. The results will be shown together in Table 2 below.

Practical Example 6

A glass substrate, formed into the same sheet shape in the same manner as the practical example 4, is chemically strengthened to be immersed in 380° C. mixture salt bath of 60 wt % $KNO_3$ and 40 wt % $NaNO_3$ for 2 hours. Thereafter, the glass substrate is water-cleaned to remove extraneous material such as molten salt attached thereto. Subsequently, the glass substrate is immersed in 40° C. etching solution of 2.0 wt % HF and moved up and down in the etching solution for 3 minutes. Thereby, the primary surface of the glass substrate is etched by about 2 μm. After that, the glass substrate is cleaned to be immersed in 30° C. cleaning solution of 10 wt % HCl for 20 minutes under an ultrasonic wave of 40 kHz being applied. Thus, the glass substrate of a practical example 6 is manufactured. It is noted that the potassium ion concentration in the primary surface of the obtained glass substrate is measured by the WDX to be 1000 ppm. The same strength measurement as the practical example 1 is conducted for the glass substrate obtained in the practical example 6. The results will be shown together in Table 2 below.

Comparative Example 2

A glass substrate, formed into the same sheet shape in the same manner as the practical example 4, is chemically strengthened to be immersed in 380° C. mixture salt bath of 60 wt % $KNO_3$ and 40 wt % $NaNO_3$ for 2 hours. After that, the glass substrate is cleaned to be immersed in 30° C. cleaning solution of 10 wt % HCl for 20 minutes under an ultrasonic wave of 40 kHz being applied. Thus, the glass substrate of a comparative example 2 is manufactured. It is noted that the potassium ion concentration in the primary surface of the obtained glass substrate is measured by the WDX to be 5500 ppm. The same strength measurement as the practical example 1 is conducted for the glass substrate obtained in the comparative example 2. The results will be shown together in Table 2 below.

TABLE 2

|  | Breaking Load P (N) | | |
| --- | --- | --- | --- |
|  | Average | Maximum | Standard Deviation |
| Practical Example 4 | 861 | 980 | 23.1 |
| Practical Example 5 | 830 | 894 | 26.3 |
| Practical Example 6 | 835 | 915 | 28.5 |
| Comparative Example 2 | 444 | 630 | 132.7 |

As understood from Table 2, the glass substrates of the practical examples 4 to 6 have higher breaking strengths than that of the comparative example 2, respectively, even though formed with a thickness of 0.7 mm, In addition, the glass substrates of the practical examples 4 to 6 show smaller standard deviations in their breaking strengths than that of the comparative example 2, respectively. These results are considered to be caused by that in each of the practical examples 4 to 6, the ion exchange layer formed on the primary surface of the glass substrate is removed by the etching. Thereby, in each of the practical examples 4 to 6, it is possible to prevent the ions of the glass substrate from being ion-exchanged for hydrogen ions in the cleaning and thus avoid formation of a tensile stress layer which would deteriorate the strength of the glass substrate.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

An only exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein.

For example, although the ion exchange layer is removed by the etching process in the aforementioned embodiment, the ion exchange layer may be removed by a process (e.g., a polishing process) other than the etching process.

The present disclosure relates to the subject matter contained in Japanese Patent Application No. P2008-333215, filed on Dec. 26, 2008, which is expressly incorporated herein by reference in its entirety.

What is claimed is:

1. A method for manufacturing a glass substrate for a cover glass for protecting a display screen of a mobile terminal device, comprising the steps of:
    chemically strengthening the glass substrate by immersing the glass substrate in heated molten salt containing potassium nitrate such that ions of the glass substrate are ion exchanged for potassium ions of the molten salt at a temperature equal to or less than a glass transition point of the glass substrate; and
    removing 1 to 3 μm of an ion exchange layer formed in an uppermost surface layer of a primary surface of the glass substrate, by etching each surface of the glass substrate after the step of chemically strengthening;
    wherein a thickness of the glass substrate is 0.5 to 0.7 mm prior to the chemical strengthening step; and
    wherein the primary surface of the glass substrate has a potassium ion concentration equal to or less than 5000 parts per million (ppm) after the 1 to 3 μm of the ion exchange layer is removed.

2. The method according to claim 1;
    wherein the etching is implemented in a wet manner using etching solution that contains at least one of hydrofluoric acid, hexafluorosilicic acid, and buffered hydrofluoric acid.

3. The method according to claim 1;
    wherein, in the step of chemically strengthening the glass substrate, the heated molten molten salt also contains sodium nitrate.

4. The method according to claim 1;
    wherein the ion exchange layer has a potassium ion concentration more than 5000 ppm before the 1 to 3 μm of the ion exchange layer is removed.

5. A method for manufacturing a glass substrate for a cover glass for protecting a display screen of a mobile terminal device, comprising the steps of:
  preparing a glass substrate having a primary surface that is a hot-formed surface;
  chemically strengthening the glass substrate by immersing the glass substrate in heated molten salt containing potassium nitrate such that ions of the glass substrate are ion exchanged for potassium ions of the molten salt at a temperature equal to or less than a glass transition point of the glass substrate; and
  removing 1 to 3 μm of an uppermost surface layer of the primary surface of the glass substrate so as to completely eliminate from the primary surface an ion exchange layer of a potassium ion concentration more than 5000 ppm, by etching each surface of the glass substrate after the step of chemically strengthening;
  wherein a thickness of the glass substrate is 0.5 to 0.7 mm prior to the chemical strengthening step.

6. The method according to claim 5;
wherein the etching is implemented in a wet manner using etching solution that contains at least one of hydrofluoric acid, hexafluorosilicic acid, and buffered hydrofluoric acid.

7. The method according to claim 5;
wherein, in the step of chemically strengthening the glass substrate, the heated molten molten salt also contains sodium nitrate.

8. The method according to claim 5;
wherein the uppermost surface layer of the primary surface of the glass substrate has a potassium ion concentration more than 5000 ppm before the 1 to 3 μm of the uppermost surface layer is removed.

* * * * *